US006625824B1

United States Patent
Lutz et al.

(10) Patent No.: US 6,625,824 B1
(45) Date of Patent: Sep. 30, 2003

(54) AUTOMATICALLY CONTROLLED SYSTEM FOR MAINTAINING A SWIMMING POOL

(75) Inventors: Peter Gustav Lutz, Johannesburg (ZA); Maynard Leslie La Cock, Benoni (ZA); Stephanus Hendrik Petrus Boshoff, Potchefstroom (ZA); Barend Jacobus De Lange, Springs (ZA)

(73) Assignee: APMI Holdings Limited, Gauteng (ZA)

( * ) Notice: Subject to any disclaimer, the term of this patent is extended or adjusted under 35 U.S.C. 154(b) by 0 days.

(21) Appl. No.: 09/889,469

(22) PCT Filed: Jan. 17, 2000

(86) PCT No.: PCT/ZA00/00008
§ 371 (c)(1),
(2), (4) Date: Sep. 26, 2001

(87) PCT Pub. No.: WO00/42339
PCT Pub. Date: Jul. 20, 2000

(30) Foreign Application Priority Data

Jan. 18, 1999 (ZA) .................................................. 99/0310

(51) Int. Cl.[7] .......................... F16K 11/074; E04H 4/12
(52) U.S. Cl. ......................... 4/507; 210/86; 137/625.21; 137/625.28
(58) Field of Search ........................ 4/507, 509; 210/86, 210/90, 106, 108, 134, 169; 137/625.2, 628, 625.21, 625.31

(56) References Cited

U.S. PATENT DOCUMENTS 3,630,363 A    12/1971   Nash et al.
3,811,712 A    5/1974    Barrera
4,525,253 A    6/1985    Hayes et al.
5,730,861 A    3/1998    Sterghos et al.

FOREIGN PATENT DOCUMENTS

EP    287 457       10/1988
GB    2020399       11/1979
WO    WO 98/20216   5/1998

*Primary Examiner*—Charles R. Eloshway
(74) *Attorney, Agent, or Firm*—Merchant & Gould P.C.

(57) ABSTRACT

The electronically controlled system of the present invention includes a regulator for regulating the flow of water through selected conduits of a filtration system associated with the swimming pool. The regulator includes a rotatable selector (32) arranged in association with a valve housing (11) having a number of inlet and outlet ports; biasing member (37) for biasing the rotatable selector (32) into a seated position in the valve housing (11); and motor (39) operatively associated with the rotatable selector (32) and adapted to rotate the rotatable selector while it is in the seated position in the valve housing (11). The system further includes a control member (50) for automatically controlling the regulator in a predetermined manner wherein the control member includes a microprocessor. In addition, the system includes at least one sensor for sending at least one adjustable variable of the swimming pool water, the sensor being connected to the control member (50), and an adjustment member for adjusting such variable in response to a signal relayed from the sensor to the control member (50).

29 Claims, 16 Drawing Sheets

AUTOMATICALLY CONTROLLED SYSTEM FOR MAINTAINING A SWIMMING POOL

TECHNICAL FIELD

This invention relates to an electronically controlled system for maintaining a swimming pool and to components employed in the operation of such a system.

BACKGROUND ART

It is well known to owners of swimming pools that the general up-keep of a swimming pool and control of pool water conditions can be relatively labor intensive and time consuming. Conventionally a swimming pool maintenance system includes a sand-filter for entrapment of solid impurities by filtration of the pool water through the sand-filter. The sand-filter is connected to a pump for pumping the pool water from the swimming pool through the sand-filter. At the core of the system is a multi-valve unit for directing flow of the pool water through an arrangement of conduits employed in the maintenance system.

The ability to direct the flow-path of pool water through different conduits by means of the multi-valve unit enables a user to execute several functions relating to swishing pool maintenance, for example, filtering, backwash, rinse and so forth.

A conventional multi-valve unit comprises a valve housing having several inlet and outlet ports, and a selector means for selectivey opening or closing the ports. The selector means has a lever mechanism with which a user may manually open one port while closing another, according to the requirements of the system.

In general, a swimming pool requires regular attention to maintain it in a usable condition. Execution of Functions such as filtration, rinse, waste and backwash is dependent on manual control by a user. In the same way regulation of other variables in relation to the pool water, such as the water level, acidity and algae growth is dependent on physical attention by a user. If a user is precluded from or fails to attend to the swimming pool on a regular basis, the swimming pool water can easily and rapidly deteriorate.

In order to minimize some of the disadvantages associated with pool maintenance chores, some pool components have been automated to effect respective automatic operation thereof. One example of a known automated swimming pool component is a water temperature sensor, often encountered in heated pools and spas, and generally operable in conjunction with appropriate heater means to regulate pool water temperature. Another example is automated pool water level detectors, which are adapted to detect a low water level and to generate a signal that causes water to fill the pool.

U.S. Pat. No. 5,730,861 discloses an automated pool maintenance system, including a novel filter valve system, novel suction valve and a novel water level sensor, wherein the valve system includes a solenoid which, when energized, effects engagement of a rotor with a conventional valve body and, when de-energized, effects disengagement of the rotor with the valve body. This valve system suffers from a major disadvantage in that a constant current rust be applied to the solenoid to effect engagement of the rotor with the valve body. Not only is this a costly requirement, but in case of termination of the current, such as during a power failure, the solenoid will be de-energized and consequently the rotor will disengage the valve body, resulting therein that pool water may drain from the swimming pool.

OBJECT OF THE INVENTION

It is accordingly an object of the present invention to overcome or at least minimize the problems experienced with known swimming pool maintenance systems, or to provide a useful alternative to such systems.

A further object of the invention is to provide an electronically controlled system for automatic maintenance of a swimming pool.

DISCLOSURE OF THE INVENTION

According to the invention there is provided an electronically controlled system for maintaining a swimming pool, the system comprising regulating means for regulating the flow of water through selected conduits of a filtration system associated with the swimming pool, the regulating means including
rotatable selector means arranged in association with a valve housing having a number of inlet and outlet ports,
biasing means for biasing the selector means into a seated position in the valve housing; and
motorized means operatively associated with the selector means and adapted to rotate the selector means while it is in the seated position in the valve housing; and
control means for automatically controlling the regulating means in a predetermined manner, the control means including a microprocessor.

The selector means may be a rotatable disc seal dimensioned to be located in a conventional valve housing of a conventional multi-valve unit used in swimming pool maintenance systems. The rotatable disc seal may include an elongate chamber and an aperture, the aperture being located radially opposite the elongate member. The rotatable disc seal may be rotatable relative to the valve housing by means of a rotatable shaft, the shaft extending vertically from the disc seal and being attached to the motorized means.

The motorized means may include any conventional electrical motor, and may be associated with a gearbox assembly. Preferably, the motorized means includes a motor capable of driving a speed reduction gearbox at a drive speed of between 0.8 and 20 rpm, with a torque of between 10 Nm and 20 Nm, the torque preferably being 16 Nm. The motorized means may be connected to the control means and may be electronically operated to rotate the disc seal to select various positions to regulate the flow of water through selected conduits of the filtration system.

The system may include first sensor means for sensing at least one adjustable variable of the swimming pool water, the sensor means being connected to the control means, and adjustment means for adjusting such variable in response to a signal relayed from the sensor means to the control means.

The first sensor means may be located on the regulating means and may include a rotatable positioning disc operatively associated with at least one positioning sensor. Preferably, the first sensor means includes a number of slotted photooptical positioning sensors arranged in accordance with the inlet and outlet ports of the valve housing. The rotatable positioning disc may have a slotted peripheral skirt which is rotatable through the slots of the photo-optical positioning sensors and which is adapted to indicate the position of a particular inlet or outlet port of the valve housing when a slot in the peripheral skirt of the positioning disc passes through a slot in one of the photo-optical positioning sensors.

One end of the rotatable shaft may protrude above the first sensor means and may include a lever arm extending from that end of the shaft, the lever arm being intended to enable a user to override the electronic functioning of the motorized means so as to adjust the rotatable disc seal manually between various positions.

The regulating means further may include a locking unit attached to the upper end of the shaft which extends vertically from the disc seal, the locking unit being adapted to facilitate installation of the rotatable disc seal by pretensioning the biasing means.

The regulating means further may include a main housing, the main housing being releasably mountable to the valve housing in a substantially pressure-tight and watertight engagement. The main housing may be adapted for supporting at least some of the components included in the system, for example the motor and gearbox assembly and different sensor means.

The main housing may be provided with a main cover being releasably attachable to an upper end of the main housing for covering the components supported in the main housing. The main housing also may include a secondary housing, the secondary housing being releasably mountable to the main housing in a splash-proof and dust-proof engagement and being covered by the rain cover. The secondary housing may house at least some of the components supported in the main housing, such as the electromic components, so as to prevent unauthorized tampering therewith, as well as to protect the same from water and dust.

The system further may include additional sensor means for respectively sensing sand-filter pressure in a swimming pool filter, pool water temperature, ambient temperature, conductivity, acidity and/or water level in the swimming pool. One or more of the additional sensor means may be located in or supported by the main housing. Preferably, all the sensor means are located in the main housing and are at least partiallry covered by the main cover.

Pressure sensor means for sensing sand-filter pressure in a swimming pool may include a pressure nipple, preferably located within the main housing and arranged in communication with a pressure transducer, the pressure transducer being capable of transmitting a signal to the microprocessor of the control means in respect of the sand-filter pressure sensed.

Preferably, the pressure sensor means for sensing sand-filter pressure includes an amplifier for amplifying a signal received from the pressure transducer before transmitting the same to the microprocessor. The microprocessor may be programmed with a predetermined algorithm adapted to utilize the signal transmitted from the pressure transducer to control operation of the regulating means. Particularly, a high-pressure value (e.g. 90–100 kPa) may be indicative of a dirty sand-filter and consequently the need for executing the backwash and the rinse functions. Similarly a low-pressure value (e.g. 40–50 kPa) may be indicative of a clean sand-filter, whereas a pressure of below 40 kPa may be indicative of a blocked pool pump inlet, which generally results in a decrease in the overall water pressure in the system.

The system may include pH-sensor means for sensing the pH-level of the swimming pool water and for returning a signal to the microprocessor in respect of the pH-level of the swimming pool water so sensed. The pH-sensor means may include a pH-probe removably housed within a probe housing that in turn may removably be located in the main housing, the arrangement being such that at least a lower part of the pH-probe is continuously submerged in the pool water. Preferably, a signal received from the pH-sensor means is amplified before being transmitted to the microprocessor, which may then compare the sensed pH-value with a preprogrammed value so as to determine the condition of the pool water (i.e. acid or alkaline). If the pH-level drops below the preprogrammed value, the microprocessor may activate a valve or chemical pump to permit one or more required chemicals (e.g acid or soda-ash) to enter the swimming pool from external chemical containers so as to adjust the pH-level of the pool water to the programmed value.

The probe housing may include retaining means for retaining the pH-probe in the probe housing; sealing means for effecting watertight engagement between the probe housing and the main housing; and an apertured chamber for in use retaining swimming pool water therein, the arrangement being such the lower part of the pH-probe is continuously submerged in the pool water being retained in the apertured chamber.

It is envisaged that the system further may include a pool ioniser, the pool ioniser being characterized in having probes consisting of copper, zinc and silver respectively used for restraining growth of algae, bacteria, viruses and the like in the swimming pool a water. The system likewise may control additional or alternative sanitizing means for automatically sanitizing the swimming pool water, for example by addition of appropriate amounts of chlorine.

The system also may include a descaler substantially used for softening or decalcifying of the pool water, the descaler being operable in conjunction with the pool pump, the arrangement being such that water flow through the system, as indicated by water pressure, may indicate a corresponding signal to be transmitted to the microprocessor, which in turn may activate the pool ioniser and/or descaler.

It is envisaged that the system further may include a temperature sensor for sensing pool water temperature, the temperature sensor being locatable within the main housing and being at least partially submerged in the pool water.

The system also may include water level sensor means adapted to sense water level in the swimming pool and to transmit a signal in respect of the water level to the microprocessor. If the water level drops below a preprogrammed value, the microprocessor may activate a water level regulating valve so as to permit water supply to the swimming pool. Preferably, the water level regulating valve is arranged in communication with a primary water supply line, the regulating valve being located on a return conduit intermediate the pool filter and the swimming pool.

The regulating means also may include an electronic interface arrangement, the electronic interface arrangement preferably being located within the secondary housing and being adapted to serve as an interface between the various sensor means and their corresponding measuring points. The electronic interface arrangement may include a number of vertically spaced electronic boards, for example a positioning board for locating the positioning sensors, an analogue board for locating one or more amplifiers for amplifying the signals received from the various sensor means, and a supply board for locating voltage regulating means.

The microprocessor of the control means may be preprogrammed with preferred values for one or more variables relating to maintenance of the swimming pool water. For example, the microprocessor may be preprogrammed in respect of the water level, water temperature and acidity of the pool water, and the pressure level in the sand-filter. Upon receiving a signal from the relevant sensing means, the microprocessor may analyze and compare a received value with the preprogrammed value for the particular variable in question. In response, the microprocessor may activate the relevant component, for example the motorized means for rotating the disc seal, the water level regulator valve for permitting water supply to the pool, or the ioniser in accordance with the pool water temperature so as to manipulate the addition of copper, zinc and silver ions to the pool water.

The microprocessor may be associated with a timer wherein the timer may serve as reference means for governing operation of the microprocessor. Alternatively, the pressure level in the sand-filter may govern operation of the microprocessor.

The microprocessor also may have display means for displaying information in respect of one or more of the variables. The display means may include an alarm and indicating lights for indicating what function is being performed at a particular moment. The microprocessor also may have a keypad whereby a user may alter one or more of the preprogrammed values. Preferably, the display means and keypad is embodied in the main cover.

Furthermore, the microprocessor nay be operable by means of a remote control unit whereby a user may override the automated function of the microprocessor so as to manually control operation of the regulating means employed in the swimming pool maintenance system. The remote control unit may include display means and a keypad by means of which a user may manipulate the relevant pool functions from a dwelling or the like location.

The system also may include a power supply unit arranged in association with the regulating means. The power supply unit may include a transformer, isolation means, circuit breakers, auxiliary relays, and battery backup means, with preferably all components being enclosed in a substantially watertight enclosure.

The invention also includes a multi-valve unit for a water flow and filtration system for a swimming pool, the multi-valve unit comprising a valve housing having a number of inlet and outlet ports;

rotatable selector means for independently opening and closing the inlet and outlet ports;

biasing means for biasing the rotatable selector means into a seated position in the valve housing; and means for automatically adjusting the selector means, while being in the seated position in the valve housing, so as to regulate water flow through the multivalve unit.

The invention further includes a method for electronically controlling the maintenance of a swimming pool, the method comprising providing regulating means for regulating the flow of water through selected conduits of a filtration system associated with the swimming pool, wherein the regulating means includes rotatable selector means arranged in association with a valve housing having a number of inlet and outlet ports, biasing means for biasing the rotatable selector means into a seated position in the valve housing; and motorized means, including a motor and gearbox assembly, operatively associated with the selector means and capable of rotating the selector means while it is in the seated position in the valve housing; and automatically controlling the regulating means in a predetermined manner.

Specific Embodiment

Without limiting the scope of the invention, one embodiment of the invention will now be described with reference to the accompanying drawings wherein:

FIG. 5 is an enlarged and exploded perspective view of the pH-probe housing illustrated in FIG. 4a;

Figure 1:
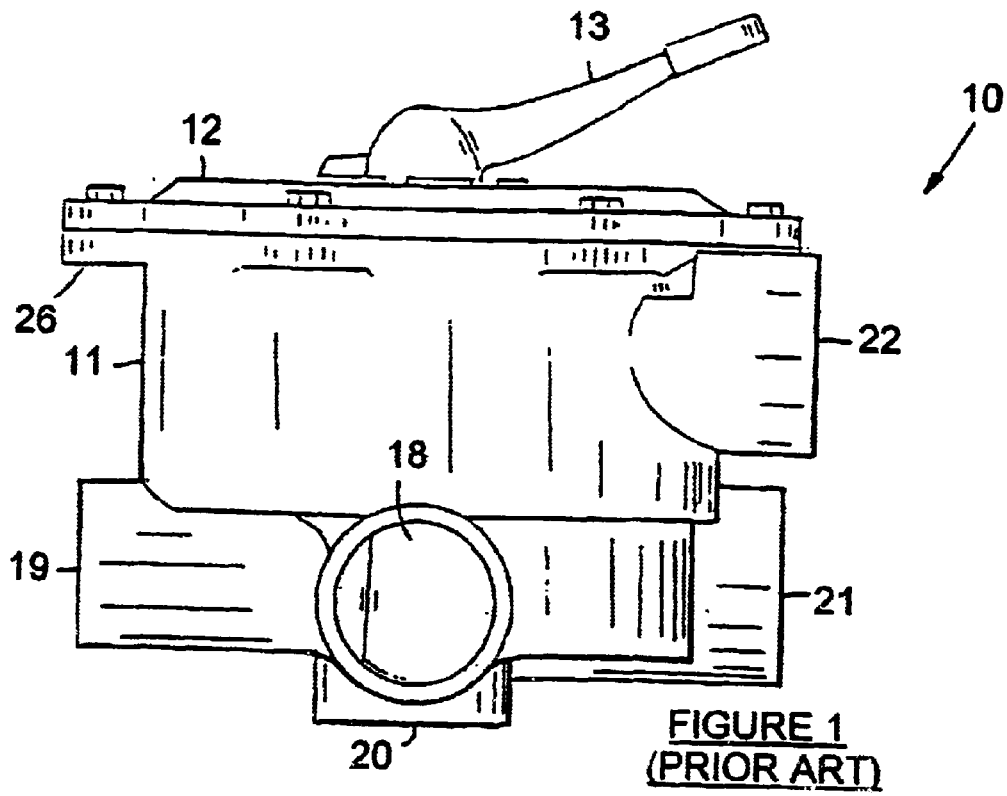
FIG. 1 is an elevation of a prior art multi-valve unit used in association with a swimming pool filter.
Figure 2:
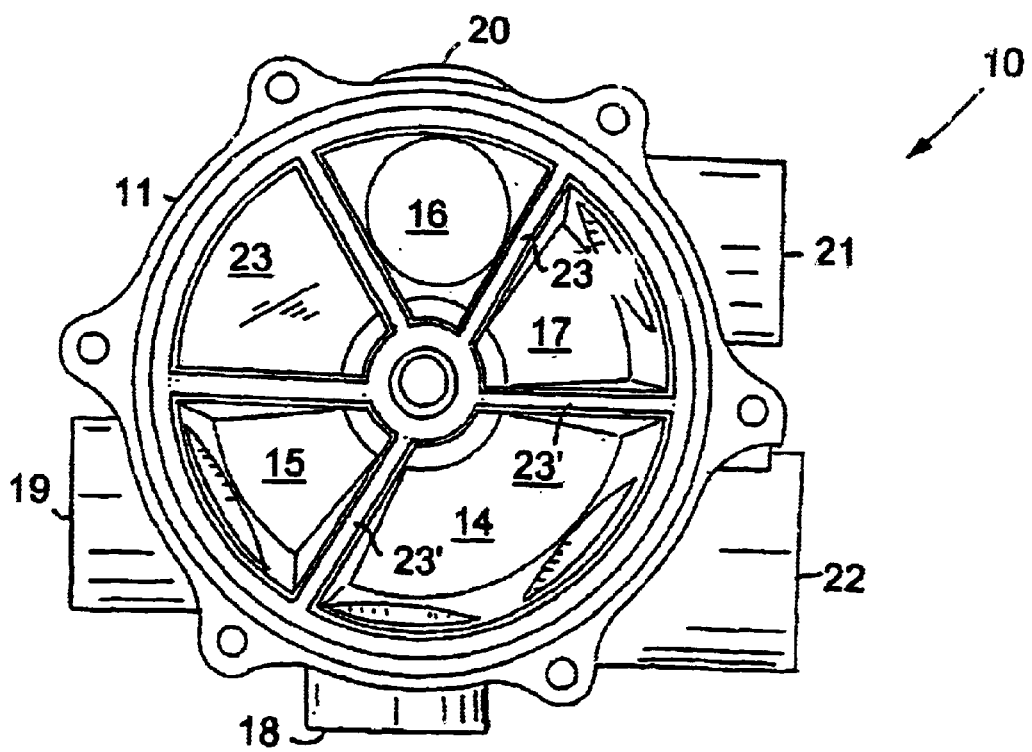
FIG. 2 is a plan view of the unit of FIG. 1 with its cover plate and selector removed.
Figure 3:
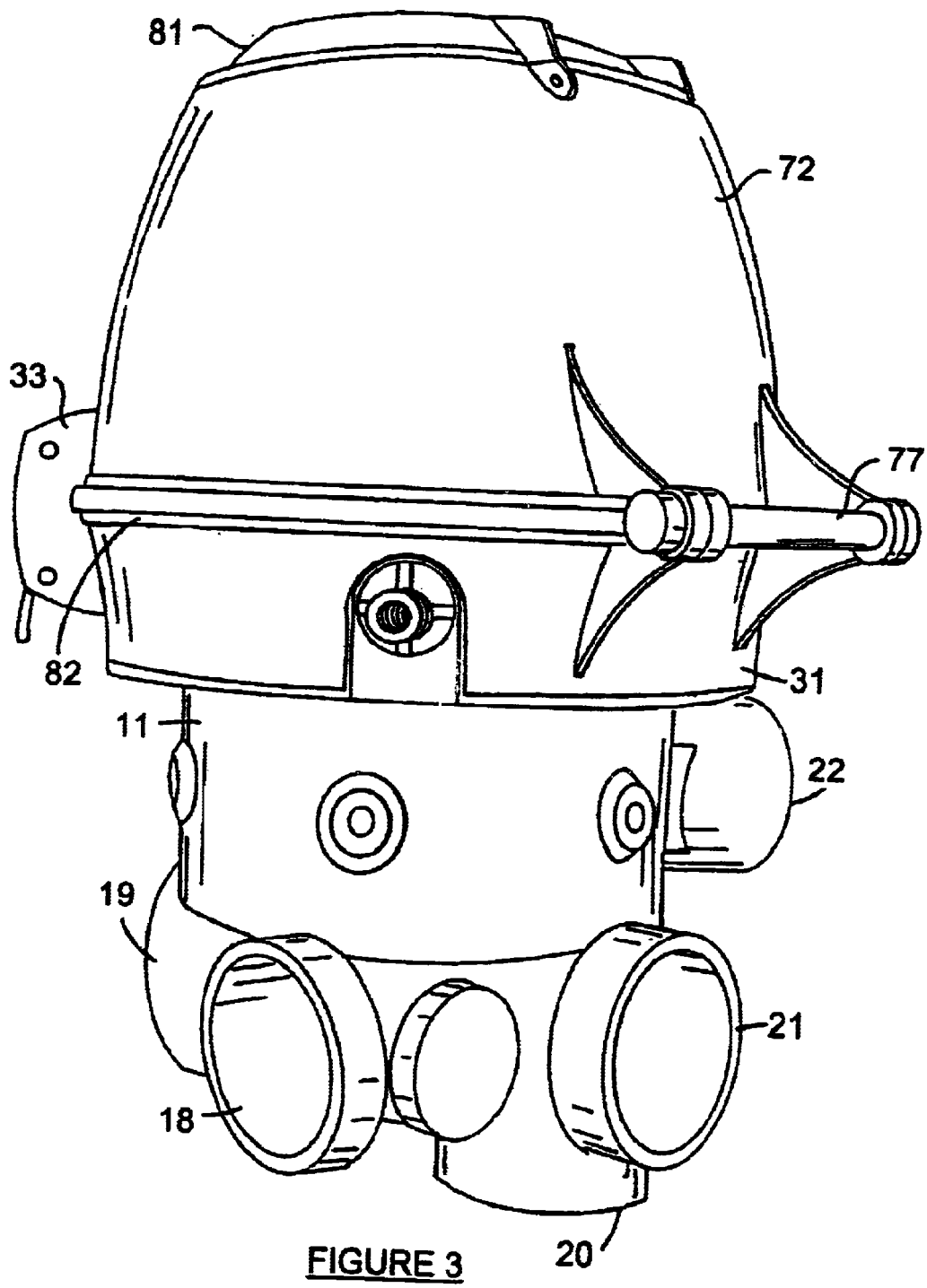
FIG. 3 is an elevation of a prior art multi-valve unit with its cover plate and selector replaced by a regulating means according to the invention.

With reference to FIGS. 1 and 2, a prior art multi-valve unit 10 is illustrated which is used to control the flow of water in a swimming pool filtration system (not shown). The multi-valve unit 10 comprises a valve housing 11, a cover plate 12 for sealing the valve housing 11, and a selector 13 mounted on the cover plate 12.

The valve housing 11 is divided into compartments 14–17 over which a seal (not shown) attached to the selector 13 is located. The arrangement is such that the selector 13 can be located in one of various rotational positions and in each position the seal attached to the selector 13 permits water in the filtration system to flow through one or mote of the compartments 14–17 according to the requirements of the filtration system.

In the case of the prior art multi-valve unit shown in FIGS. 1 and 2 there are four operative compartments in the valve housing 11, the compartments being designated 14, 15, 16 and 17. Compartment 14 is in communication with a port 18, compartment 15 with a port 19, compartment 16 with a downwardly directed port 20 and compartment 17 with a port 21. In addition, an inlet port 22 leads into the valve housing 11 above the compartments 14–17. Numeral 23 designates a platform which is located between compartments 15 and 16 but which is itself not a compartment. The compartments 14–17 are separated by partitions 23'.

According to the invention the selector 13 of the prior art multi-valve unit 10 and its associated cover plate 12 and seal (not shown) is replaced with a main housing 31 and rotatable disc seal 32 of a regulating means illustrated in FIGS. 3 to 6. The main housing 31 is intended to be mounted on the valve housing 11 of the prior art multi-valve unit 10 similarly to the way that the cover plate 12 is mounted to the valve housing 11. In particular, the main housing 31 is mounted to the valve housing 11 by means of bolts (not shown) that pass through a base portion 34 of the main housing 31 and connects the main housing 31 to a peripheral flange 26 of the valve housing 11. The main housing 31 and rotatable disc seal 32 are so constructed that when the main housing 31 is mounted on the prior art valve housing 11 shown in FIGS. 1 and 2, the rotatable disc seal 32 is seated on the partitions 23' dividing compartments 14–17. At least one O-ring 35 is provided for sealing the main housing 31 on the valve housing 11.

The rotatable disc seal 32 and main housing 31 are operatively associated by means of a shaft 36 extending vertically from the disc seal 32 through the main housing 31. A stainless steel spring 37 is located between the main housing 31 and rotatable disc seal 32, urging the disc seal 32 into the seated position on the partitions 23'. At least one O-ring 25 is located intermediate the shaft 36 and the main housing 31 for procuring a watertight fit between the same.

A stainless steel upper end 36' of the shaft 36, which is vertically movable, is attached to a gearbox 38 and motorized means 39 for rotating the disc seal 32 between various rotational positions. The motorized means 39 preferably includes a low voltage motor capable of driving a speed reduction gearbox at a drive speed of between 0.8 and 2.0 rpm and a torque of approximately 16 Nm.

According to one form of the invention, a locking unit is provided, the locking unit including a locking pin (not shown), which in use extends through a locking aperture 84 protruding through an upper end of the shaft 36', the arrangement being such that prior to installation of the regulating means in the valve housing 11, the locking pin urges against sensor means 40 for maintaining the shaft 36' in proper position. After installation of the main housing 31 on the valve housing 11, the locking pin is vertically displaced from the sensor means 40 as a consequence of compression of the stainless steel spring 37.

Automatic operation of the rotatable disc seal 32 is afforded by a microprocessor of a control unit 50 (see FIGS. 18 to 22) which is operatively associated with the motorized means 39. The microprocessor is programmed to control rotation of the disc seal 32 in a predetermined sequence and where necessary by means of selected feedback signals.

The rotatable disc seal 32 is arranged in communication with first sensor means 40, the first sensor means 40 being housed within a secondary housing 74 and being adapted to regulate rotation of the rotatable disc seal 32. More particularly, the first sensor means 40 is a slotted photo-optical switch that includes a rotatable positioning disc 40.1 and one or mote positioning sensors 40.2. The positioning sensors 40.2 are slotted photo-optical sensors, each consisting of a photo transmitter (ie. an infrared diode) and an optical receiver. The photo-optical positioning sensors 40.2 are preferably spaced approximately 60 degrees apart on an positioning board 200.1 of an electronic interface arrangement 200, with each positioning sensor 40.2 corresponding to a port of the valve housing 11.

The rotatable positioning disc 40.1 is attached to the upper end 36' of the shaft 36 and includes a peripheral slotted skirt 40.1.1 adapted to rotate through the slots of the photo-optical positioning sensors 40.2. The peripheral skirt 40.1.1 of the rotatable positioning disc 40.1 includes two vertically orientated slots 40.1.2 arranged approximately 2 mm apart for effecting speed reduction and appropriate location of the positioning disk 40.1 with respect to the positioning sensors 40.2.

In use, when a particular photo transmitter is energized, it transmits light onto its corresponding optical receiver. The optical receiver consequently transmits a signal to the microprocessor of the control unit 50. When a first slot 40.1.2 of the rotatable positioning disc 40.1 passes through an energized photo sensor 40.2, it pulses the microprocessor. The microprocessor sends a signal to the motorized means 39 so that voltage in the motor is decreased, resulting in a decrease in rotational speed of the positioning disc 40.1. When a second slot 40.1.2 of the rotatable positioning disc 40.1 passes through the photo-optical sensor 40.2, voltage supply to the motor is terminated, bringing the rotatable disc seal 32 to a halt. In this way the rotatable disc seal 32 can be positioned for performing any of the functions of filter, rinse, backwash or the like.

Figure 14:
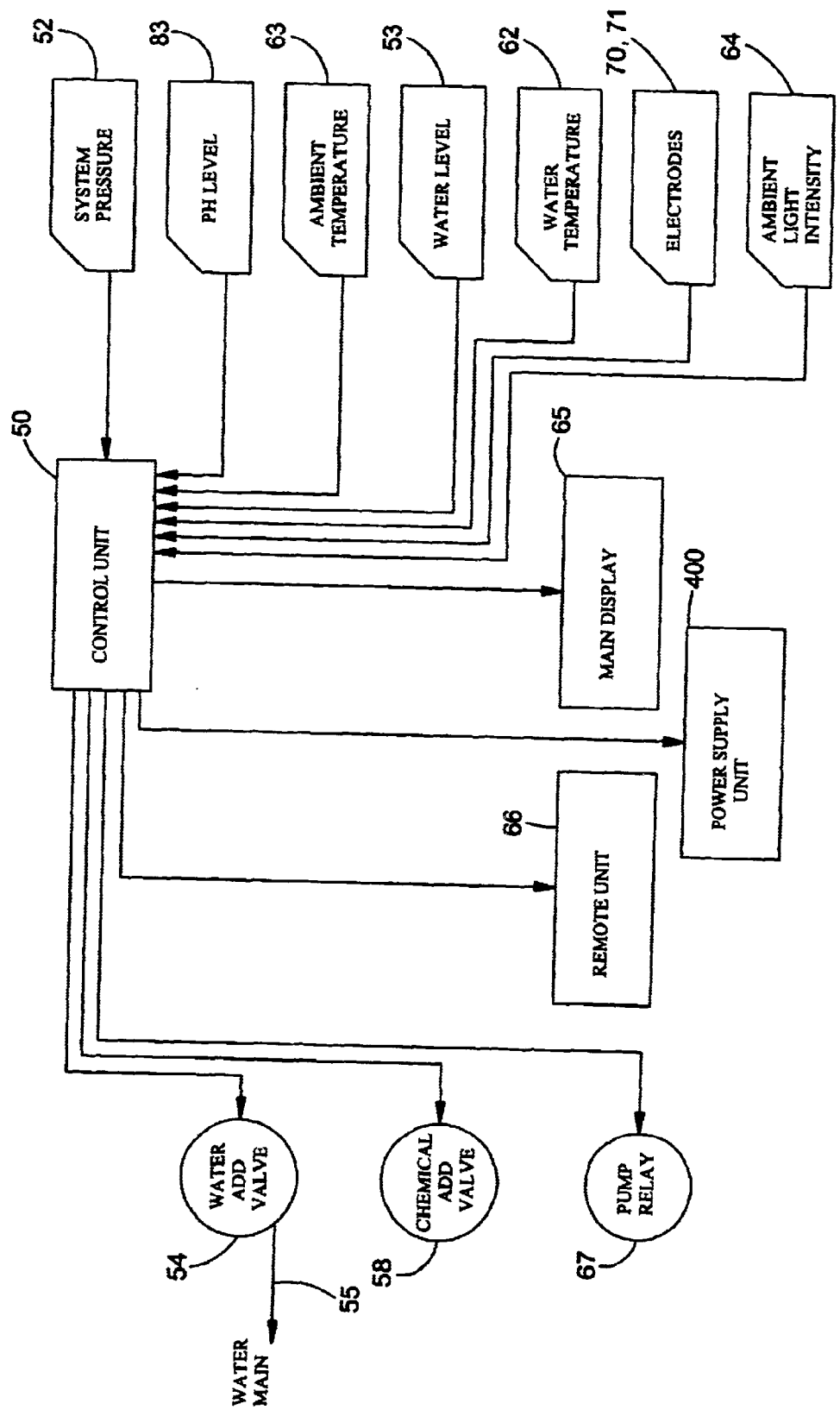
FIGS. 14, 18, 20 and 21 are schematic flow diagrams further illustrating the operation of the invention.
Figure 20:
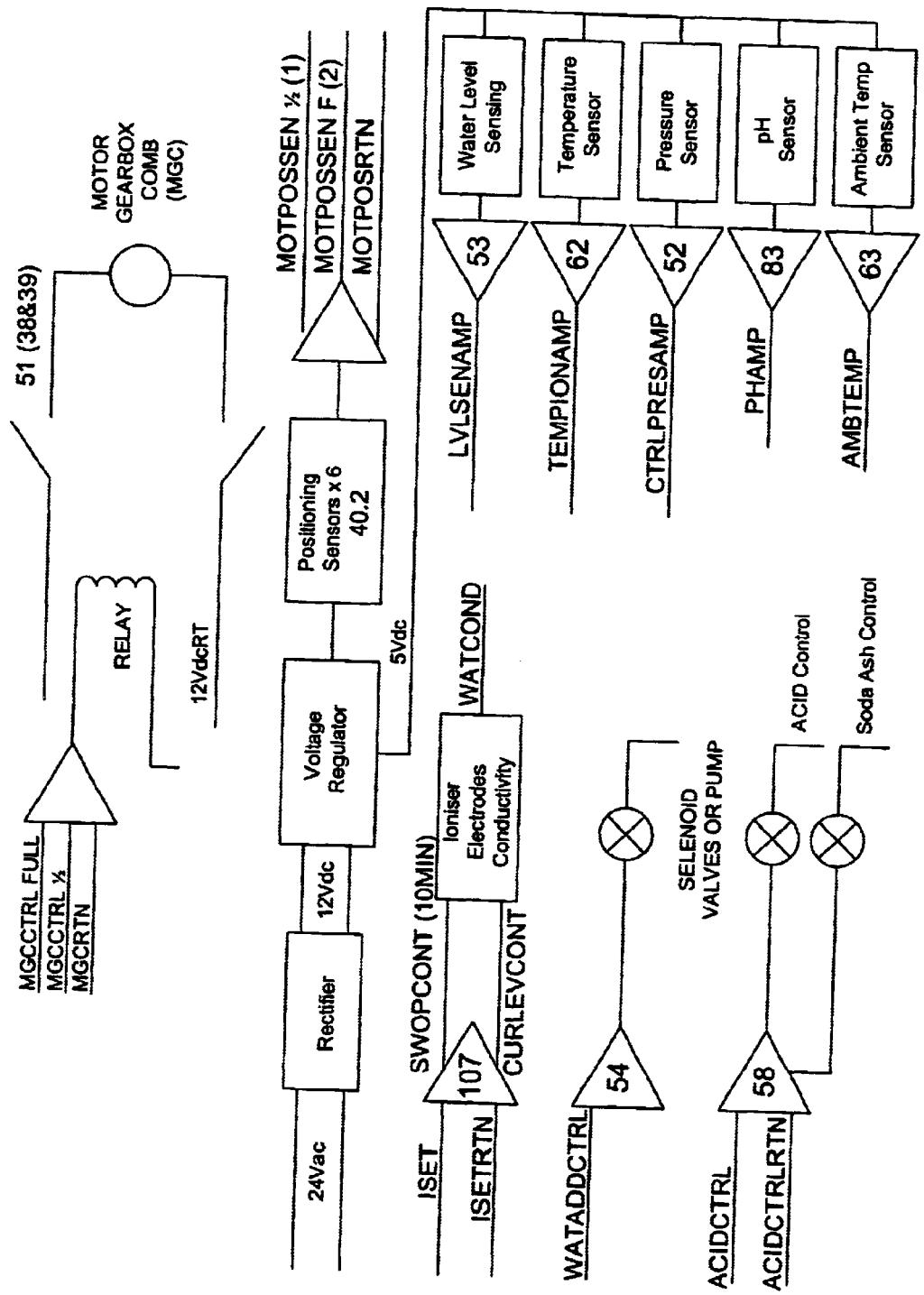
Figure 21:
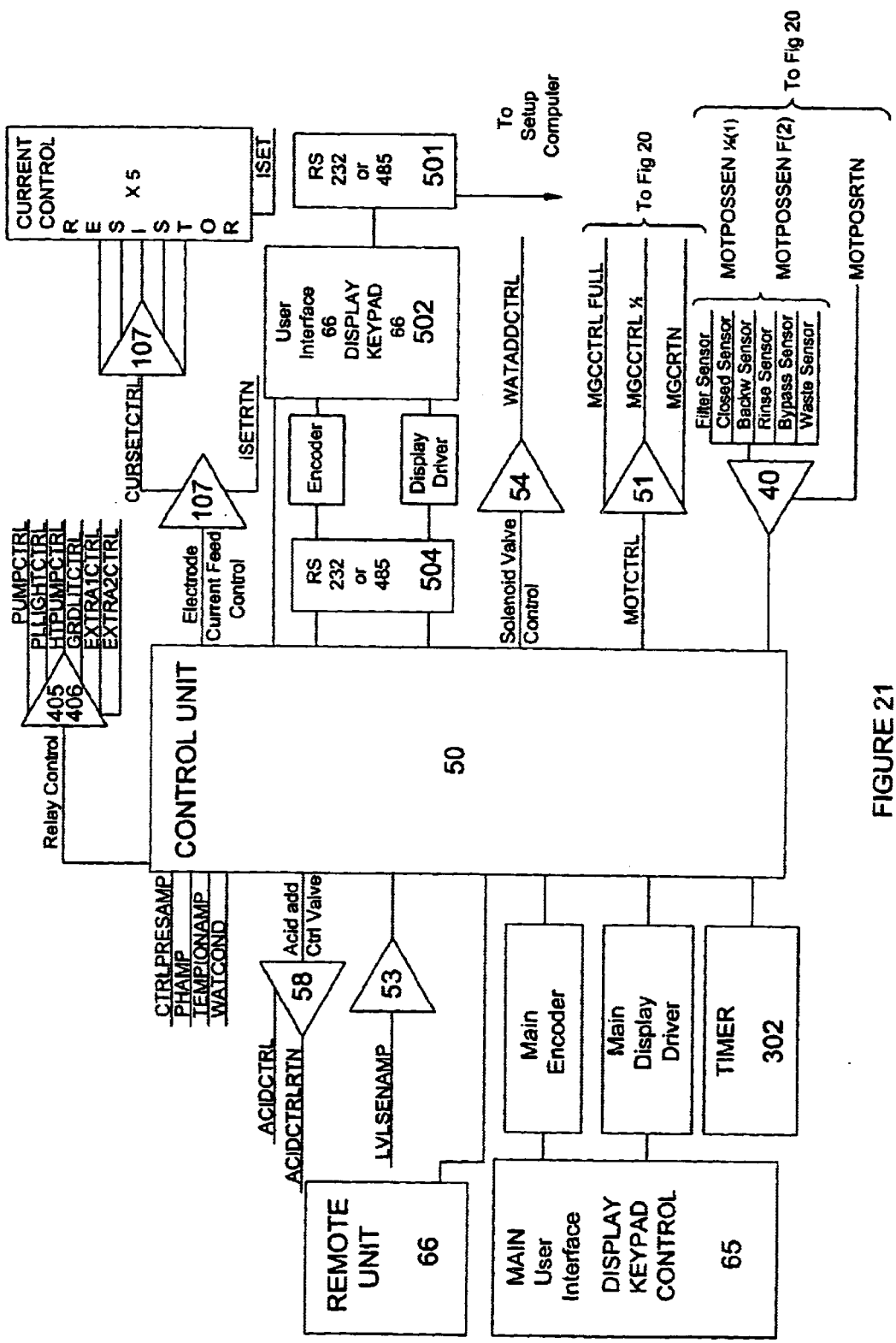

Referring to FIGS. 14, 20 and 21, the control unit 50 transmits a signal "MOTCTRL" to the motorized means 39 which is activated by a semi-conductor switch to rotate the position disc 40.1 to a preferred position as determined by the control unit 50.

Figure 7:
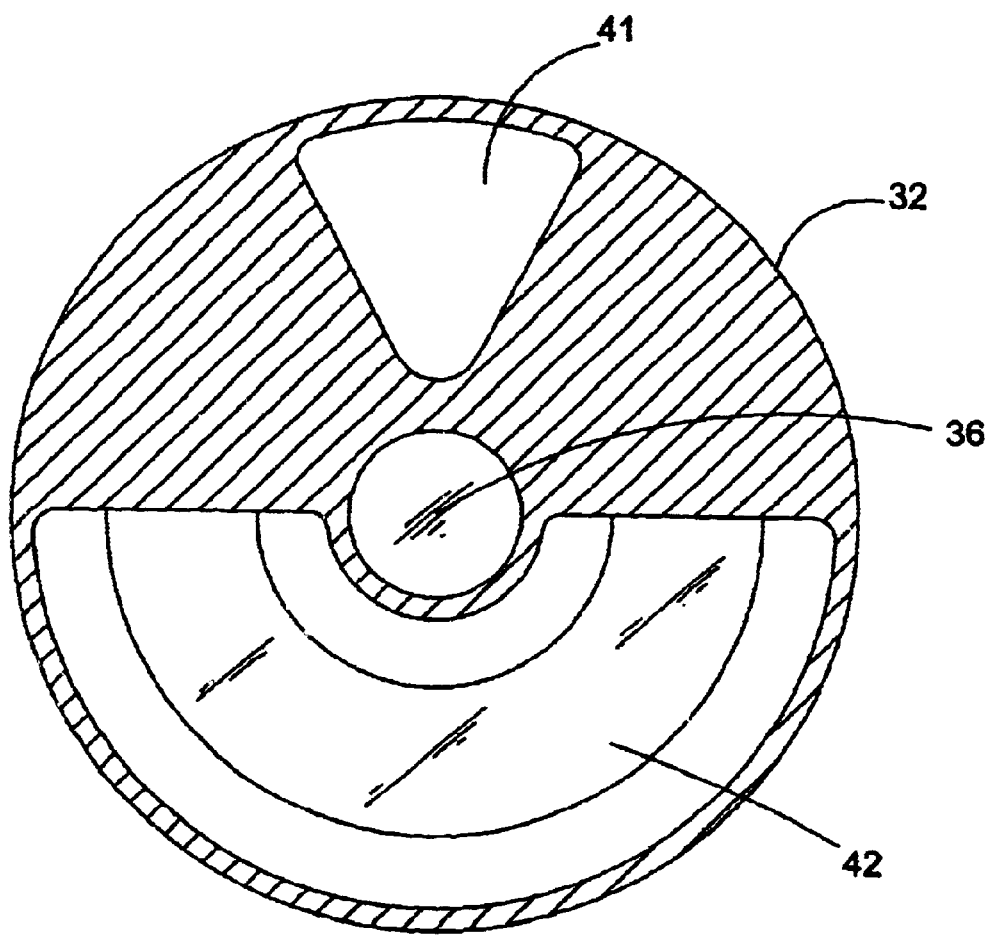
FIG. 7 is a section of the disc seal of FIGS. 4a and 6.

The rotatable disc seal 32 includes an aperture 41 and an elongate chamber 42, located radially opposite to aperture 41, as more clearly illustrated in FIG. 7. When the rotatable disc seal 32 is seated on the partitions 23', the apert 41 and elongate chamber 42 are arranged in communication with one or more of compartments 14–17 shown in FIG. 2 respectively. The rotatable disc seal 32 is smooth finished at the bottom thereof so as to decrease frictional resistance. In addition, all edges of aperture 41 and elongate chamber 42 are rounded or chamfered to approximately 3 mm at an angle of approximately 45° to facilitate rotation of the disc seal 32. A semi circularly profiled wagon wheel gasket 24 is located between the rotatable disk seal 32 and the valve housing 11 further to facilitate rotation of the disc seal 32.

To illustrate the working of the rotatable disc seal 32, reference is now made to FIGS. 8 to 13.

Figure 8:
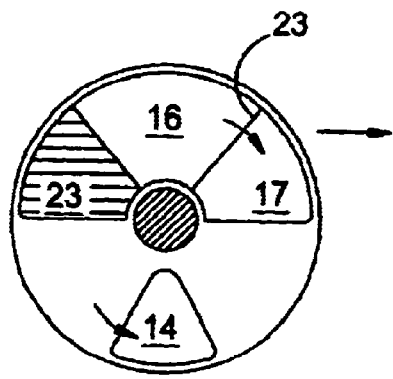
FIGS. 8 to 13 illustrate the rotatable disc seal of FIG. 7, when seated in the valve housing of FIGS. 1 and 2, in various rotational positions to procure the different functions of filtering, rise, bypass, backwash and waste respectively

FIG. 8 illustrates the disc seal 32 position for the filtration function of the swimming pool filtration system. Water from the swimming pool enters the valve housing 11 through inlet port 22. The water passes through aperture 41 in the disc seal 32, exits the valve housing 11 through port 18 and enters the sand-filter (not shown) from the top thereof. From the bottom of the sand-filter the water enters the valve housing 11 through port 20 and passes into elongate chamber 42, which is then in communication with compartments 16 and 17. The water passes through compartment 17 and enters the swimming pool through port 21.

Figure 9:
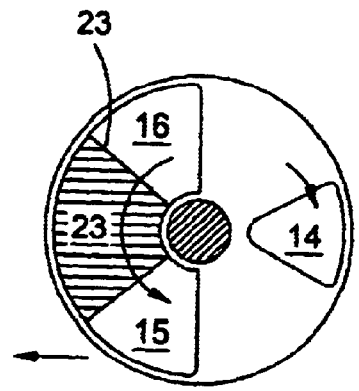

For rinsing of the swimming pool water, the disc seal 32 is rotated to the position illustrated in FIG. 9. The pool water enters compartment 14 through aperture 41, exits the valve housing 11 through port 18 and enters the sand-filter from the top. From the bottom of the sand-filter, the water flows through compartment 16, which is then in communication with the elongate chamber 42, passes through compartment 15 and exits the filtration system as waste through port 19.

Figure 10:
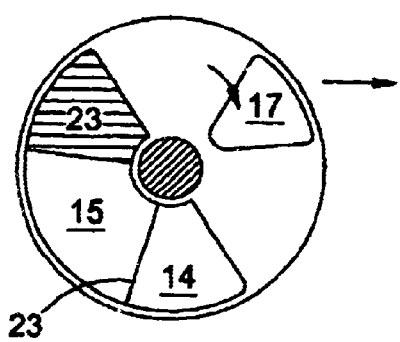
Figure 11:
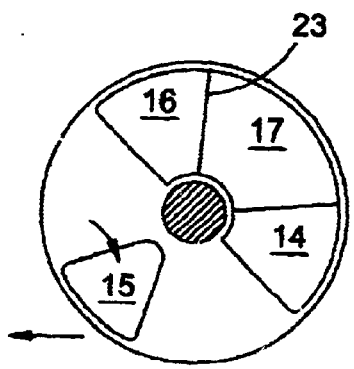

FIG. 10 illustrates the bypass function of the rotatable disc seal 32. The swimming pool water passes through aperture 41, which is in communication with compartment 17 and enters the swimming pool through port 21. Similarly, the waste function position of the disc seal 32, illustrated in FIG. 11, allows the pool water to enter compartment 15 through aperture 41, so as to exit the filtration system as waste through port 91.

Figure 12:
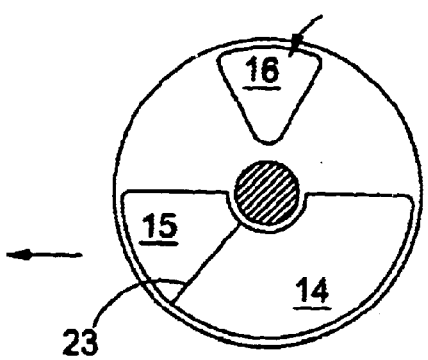

In FIG. 12 the disc seal 32 position for procuring the backwash function is illustrated. Pool water passes through aperture 41, exits the valve housing 11 through port 20 and enters the sand-filter from the bottom thereof. After passing through the sand-filter, the water enters chamber 14 through port 18, passes through compartment 15 via elongate chamber 42 and exits the filtration system through the port 19.

When the microprocessor determines that the sand filter is dirty, the pool pump (not shown) is turned off. The photo-optical sensor corresponding to the backwash operation is energized and the rotatable disc seal 32 is rotated to the position for backwash illustrated in FIG. 12. The pool pump is turned on and the backwash function is executed.

Figure 13:
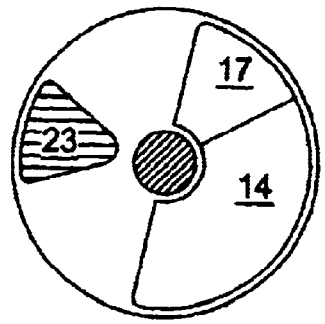

FIG. 13 illustrates the closed position of the disc seal 32 for calibrating the microprocessor according to the water pressure associated with a particular pool pump employed in a specific filtration system. Calibration is achieved by pumping pool water through inlet port 22, while aperture 41 is sealed by platform 23 of the valve housing 11, and then measuring the water pressure generated in the filtration system.

Figure 4A:
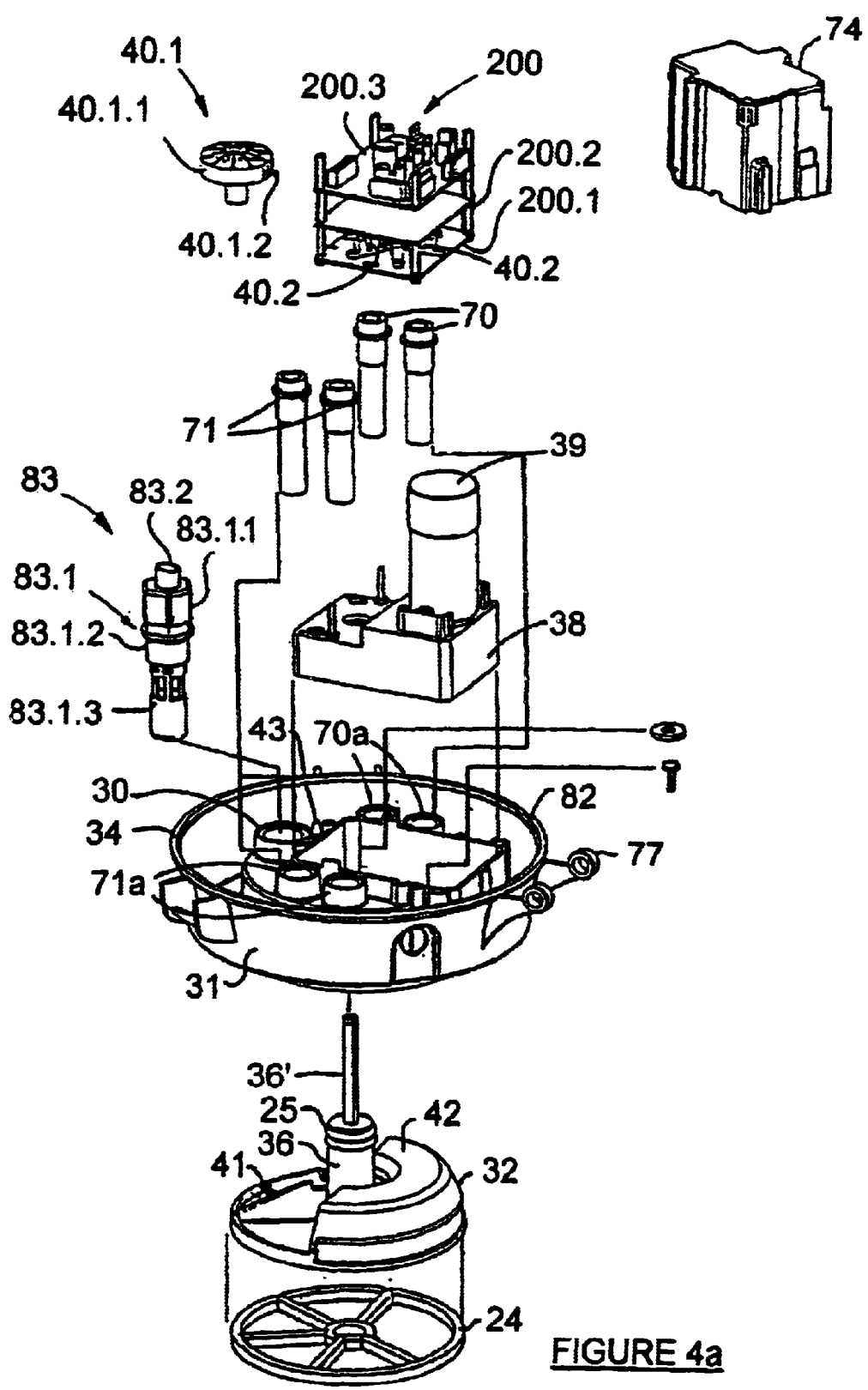
FIGS. 4a and 4b are exploded perspective views of the lower part and the upper part respectively of the regulating means according to the invention.
Figure 4B:
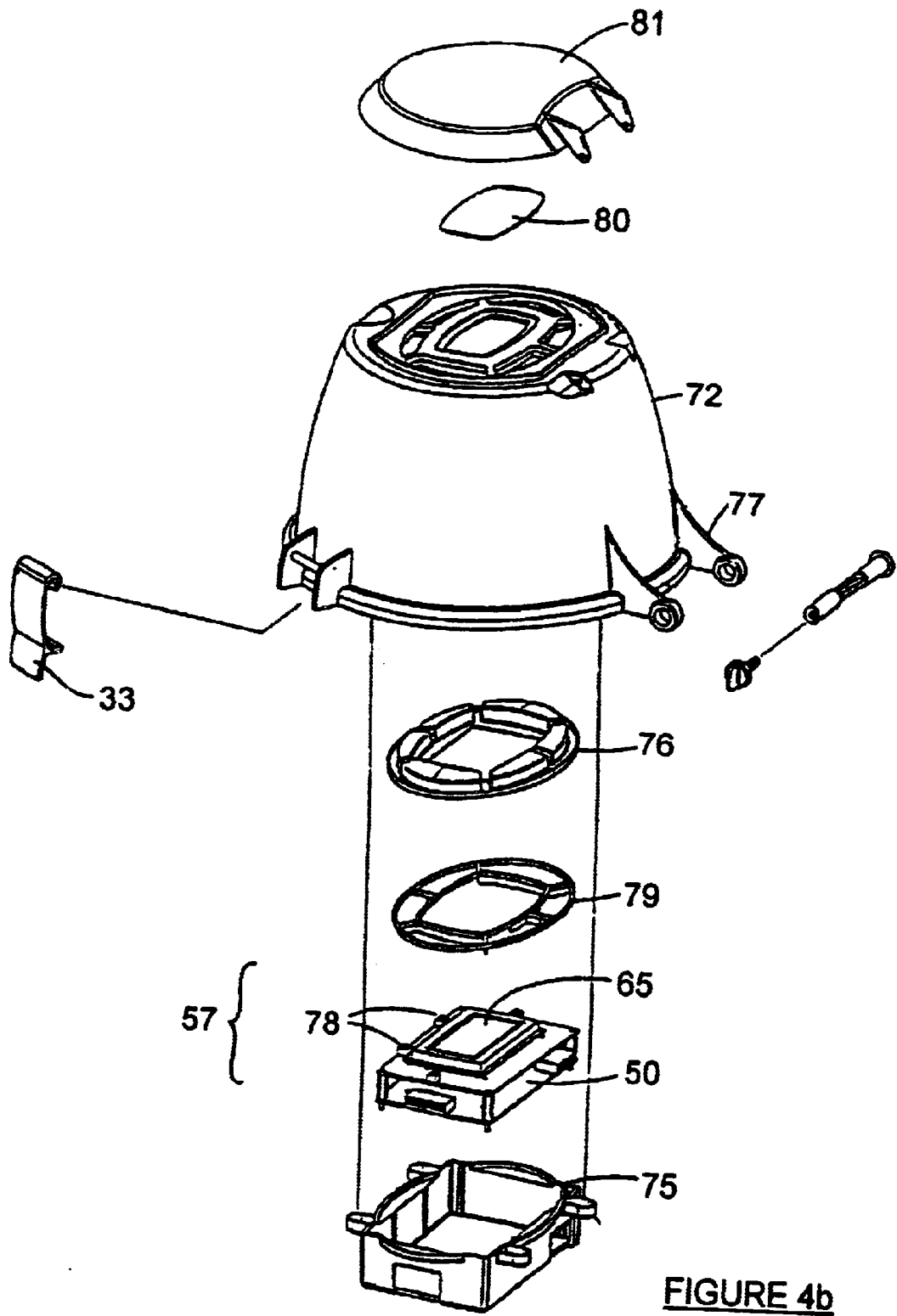

Water pressure in the pool is measured by means of a pressure sensor 52 (FIGS. 14 and 20) located on an analogue board 200.2 of the electronic interface arrangement 200 (FIG. 4). The pressure sensor 52 is arranged in communication with a pressure nipple 43 that extends through the main housing 31. The pressure sensor 52 is preferably a 0–200 kPa pressure transducer. If the water pressure, as measured with the disc seal 32 being in the position illustrated in FIG. 13, is below the calibrated value for the water pressure, it indicates improper functioning of the pump impeller. Generally, when the disc seal 32 is in the filtration position as illustrated in FIG. 8, a high pressure of 90–100 kPa is indicative of a dirty sand filter, while a low pressure of 40–50 kPa is indicative of a clean sand filter.

The pressure sensor 52 transmits an amplified signal "CTRLPRESAMP" to the control unit 50 via the electronic interface arrangement 200 (FIGS. 4, 18, 20 and 21). The transmitted signal is compared with a set of pre-programmed pressure values in the control unit 50, which in turn initiates the appropriate functions. The electronic interface arrangement 200 includes a number of vertically spaced electronic boards, for example a positioning board 200.1 for locating the positioning sensors, an analogue board 200.2 for locating one or more amplifiers for amplifying the signals received from the various sensor means, and a supply board 200.3 for locating voltage regulating means.

Figure 15:
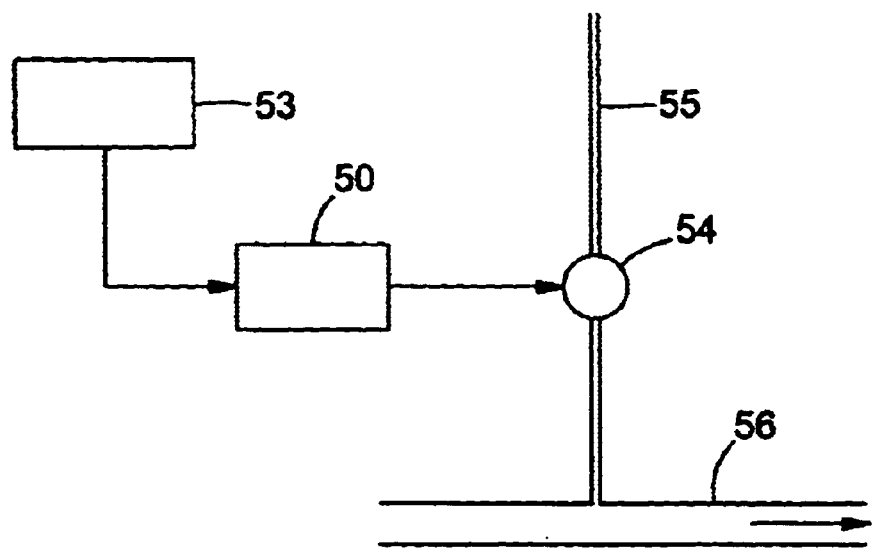
FIGS. 15 and 16 are schematic diagrams illustrating further aspects of the invention.

In addition to the filtration functions described above, the control unit 50 may be employed automatically to control numerous other functions of swimming pool maintenance. For example, the water level of a swimming pool may be controlled automatically. Thus, as illustrated in FIGS. 14 and 15, a water level sensor 53 may be provided which is connected to the control unit 50. The control unit 50 is in turn connected to a solenoid valve 54 which is itself connected to a main water supply 55, which is in turn connected to a conduit 56 leading into the swimming pool (not shown).

According to one form of the invention, the water level sensor 53 includes three distinctive vertically spaced sensors: a top sensor corresponding to a high water level, a middle sensor corresponding to a low water level, and a bottom sensor constituting a ground connection. When the top sensor of the water level sensor 53 is submerged in the pool water, the swimming pool water constitutes an electronic contact between the top and middle sensor respectively with the ground sensor. When the water level in the swimming pool drops below a predetermined level, a signal is transmitted by the water level sensor 53 to the control unit 50, which in turn energizes the solenoid valve 54 to open so as to admit water from the main water supply 55 to enter the swimming pool. When the water level reaches a predetermined level as measured by water level sensor 53, the solenoid valve 54 is denergized via the control unit 50.

A time-delay function in the order of 30 seconds is incorporated in the water level sensor 53 to prevent false triggering thereof by fluctuation in the water levels caused by, for example, surface wind. The time delay function results therein that the water level will be altered only if the water level sensor 53 senses a constant incorrect water level for a continuous period of 30 seconds.

Figure 5:
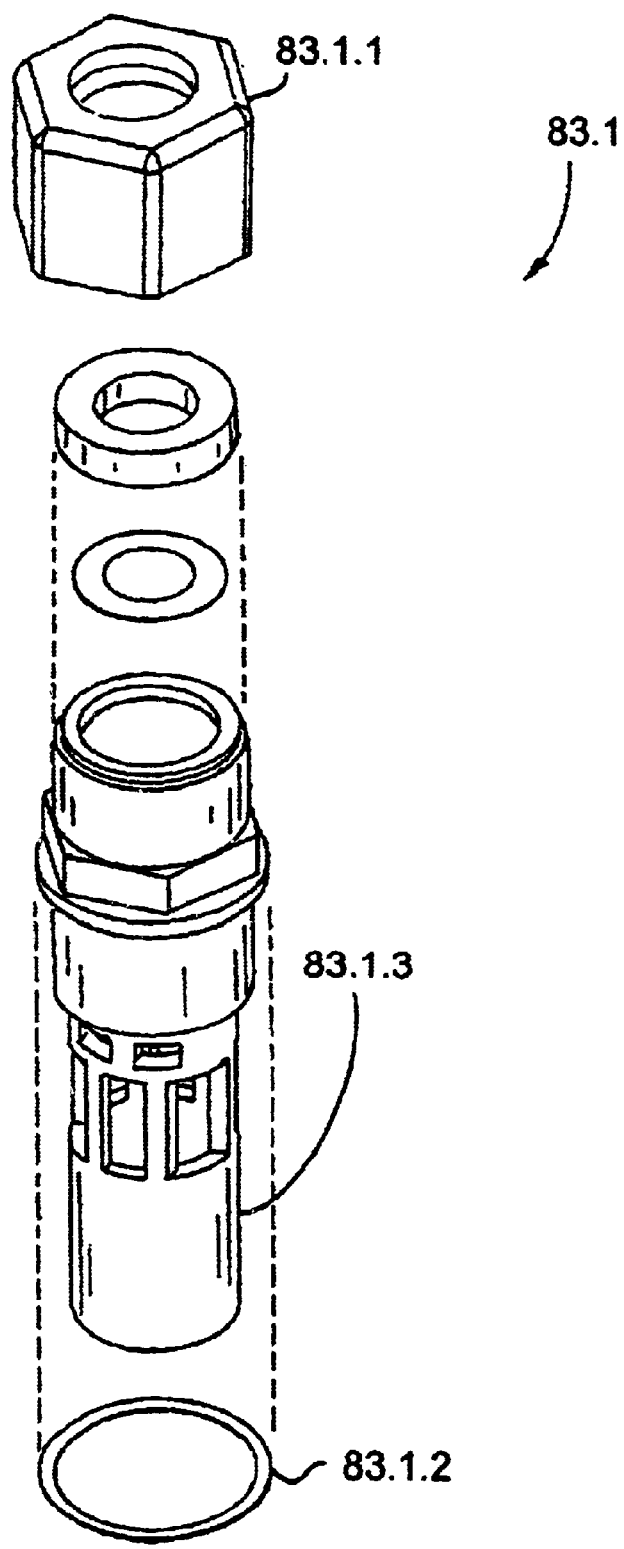
Figure 6:
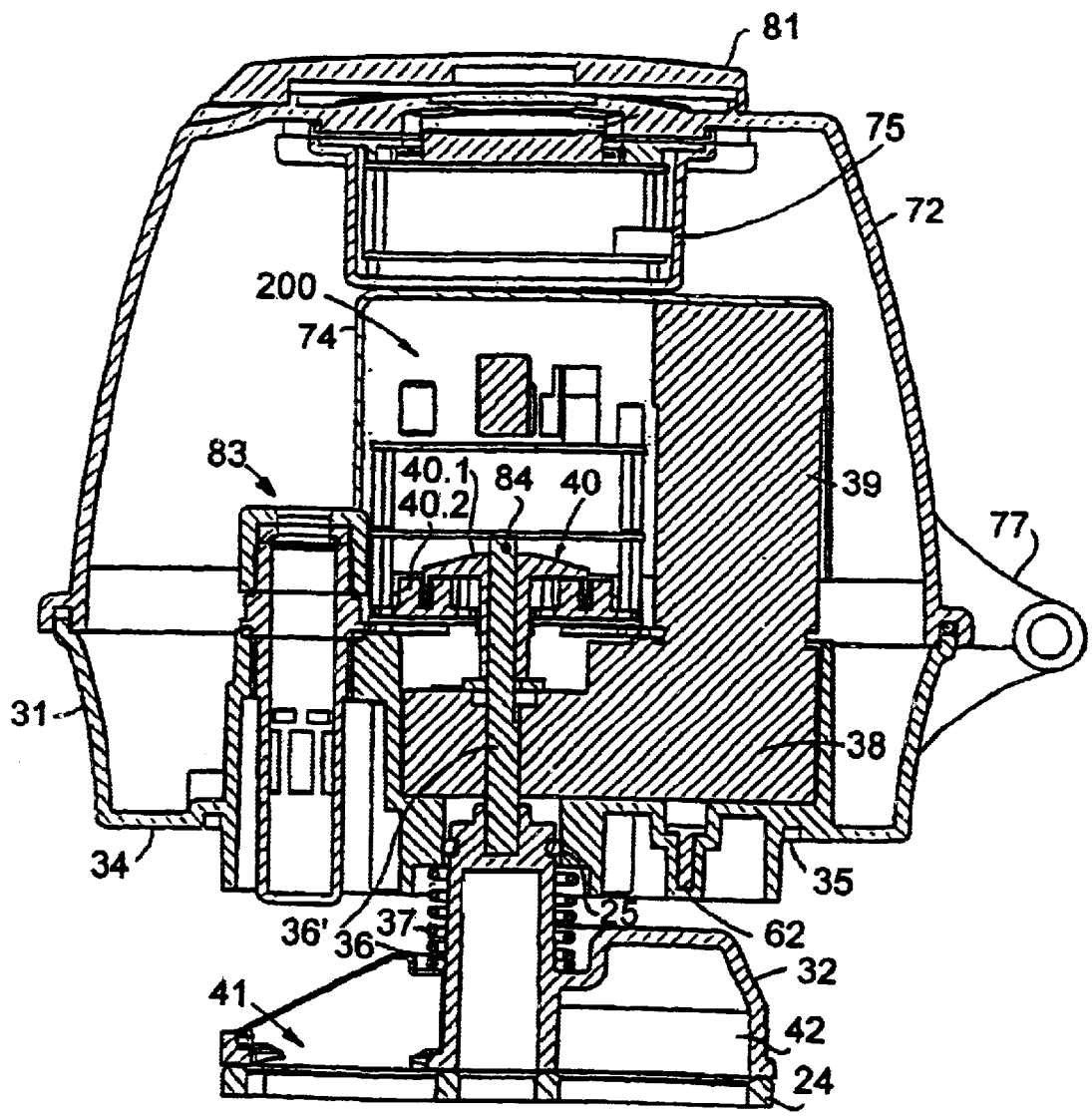
FIG. 6 is a cross-sectional side view of the regulating means of FIGS. 4a and 4b in an assembled condition.

Similarly, the pH level of the pool may be controlled automatically by means of a pH level sensor means 83. The pH level sensor means 83 includes a pH-probe 83.2 that is removably housed within a probe housing 83.1, which in turn is removably located in the main housing 31, the arrangement being such that at least a lower part of the pH-probe 83.2 is continuously submerged in pool water. The main housing 31 includes an aperture 30 for screw-fit location of the probe housing 83.1 therein so that it is at least partially submerged in the pool water (FIGS. 4a, 5 and 6).

The probe housing 83.1 includes retaining means 83.1.1 for retaining the pH-probe 83.2 in the probe housing 83.1; sealing means 83.1.2 for effecting watertight engagement between the probe housing 83.1 and the main housing 31; and an apertured chamber 831.3 for, in use, retaining swimming pool water therein, the arrangement being such that the lower part of the pH-probe 83.2 is continuously submerged in the pool water being retained in the apertured chamber 83.1.3.

Those who are familiar with the technology, will appreciate that difficulties will be incurred in obtaining accurate ph-readings if the highly sensitive pH-probe 83.2 is either not submerged in the pool water, or if it is directly submerged in relatively turbulent water, such as swimming pool water. If the pH-probe 83.2 is not submerged in the pool water for a prolonged period of time, it will dry out, resulting in permanent damage to the pH-probe 83.2. On the other hand, turbulent water flow conditions often result in formation of micro-bubbles on the surface of the pH-probe 83.2, which effects current flow in the direct vacinity of the pH-probe 83.2 and which influences ph-readings. The applicants believe that use of the novel probe housing 83.1 will overcome or at least minimize these difficulties because of the fact that the pH-probe 83.2 is continuously located in relatively non-turbulent water.

Figure 16:
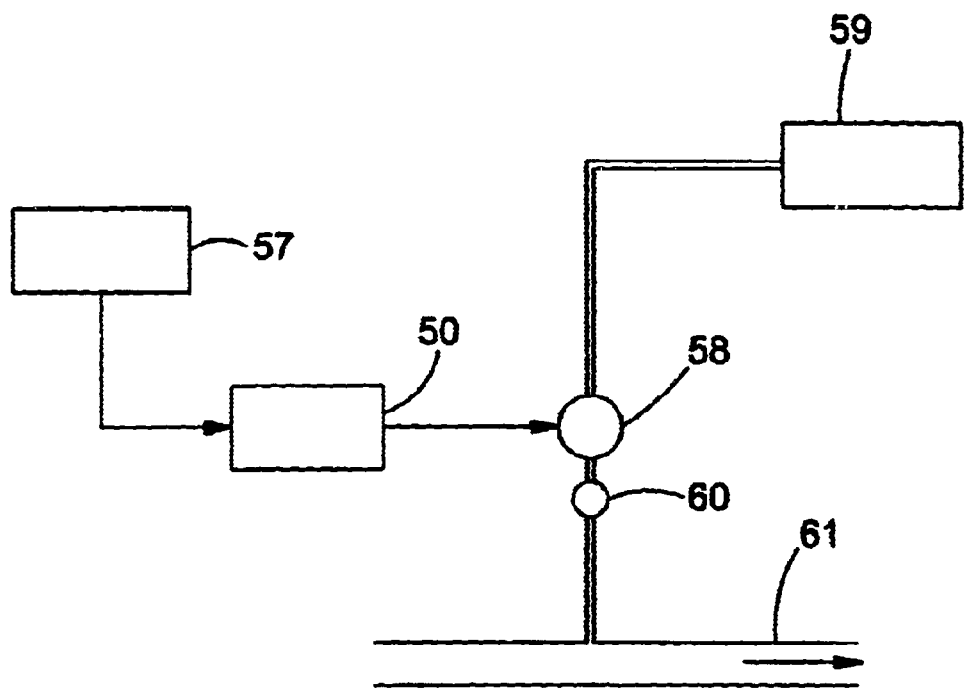

As shown in FIGS. 14 and 16, the pH probe 83.2 is connected to the control unit 50. The control unit 50 is in turn connected to a chemical valve or pump 58 which controls the flow of a chemical from an external chemical container 59 via a non-return valve 60 to a conduit 61 which leads into the swimming pool. This chemical control system works similarly to the water level control system described above with the non-return valve 60 preventing water from flowing back into the chemical container 59.

Upon installation of the pH-probe 83.2, the probe 83.2 is fist calibrated in accordance with a pre-programmed software calibration sequence and with reference to a standard pH 7 buffer. In use the pH-probe 83.2 senses the pH value of the water and transmits an amplified signal "PHAMP" (FIGS. 18, 20 and 21) via the electronic interface arrangement 200 to the control unit 50. The control unit 50 is pre-programmed with an algorithm which is dependent on the pool size and which calculates the amount of acid or soda ash to be fed to the pool water in order to obtain the preferred pH level in the pool water. The signal "ACIDCTRL" activates the chemical valve or pump 58 for adding the required amount of acid, soda ash or the like into the pool water. The pH value is displayed on a main display 65 and a remote unit 66. When the acid value is low the control unit 50 alerts the user by means of an audible alarm.

The main housing 31 further includes a temperature sensor 62 (FIG. 6) for sensing the temperature of the pool water, in response to which an amplified signal "TEMPIONAMP" is transmitted to the microprocessor.

In FIG. 14 other functions are indicated which may conveniently be controlled or measured automatically by the control unit 50. These include measuring ambient temperature with the aid of temperature sensor. 63 The control unit 50 may also measure ambient light intensity with the aid of a light sensor 64 so as to manipulate relay outputs associated with the system, for example those employed in controlling pool lights (not shown) or garden lights (not shown). Moreover, the control unit 50 includes a main display 65 which may, for example, be located at the pump filter, and a remote unit 66 with associated remote display 503 which may, for example, be located within a dwelling house adjacent the swimming pool. For purposes of operating the swimming pool pump (not shown) which pumps the swimming pool water, the control unit 50 is connected to a pool pump relay 67.

The system further includes a pool ioniser adapted to facilitate release of ions into the pool water for purifying the pool water. The pool ioniser consists of two pairs of electrodes 70 and 71 which are removably screwed into apertures 70a and 71a within the main housing 31 and spaced approximately 30 mm apart. The electrodes 70 and 71 may for example be approximately 50 mm in length and 14 mm in diameter. Both pairs of electrodes 70 and 71 consist of an alloy of copper, zinc and silver.

Figure 18:
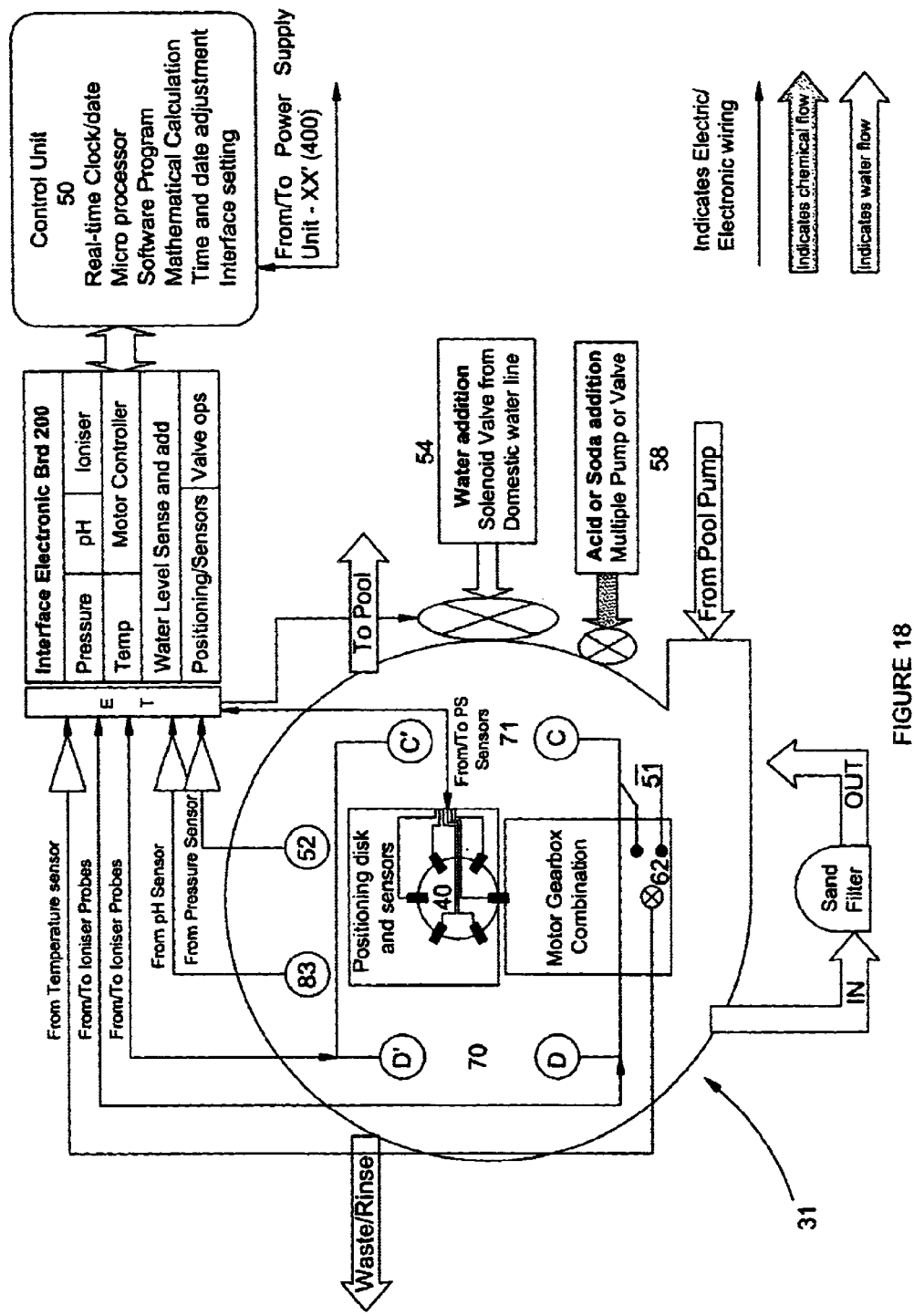

Referring now to FIGS. 18, 20 and 21. Two routes of operation of the pool ioniser are available, namely a manual setting route and a temperature setting route. According to the manual setting route an ionizing current is set at a fixed value. The regulating means then controls this current so as to ensure that it stays as dose as possible to the fixed value.

According to the temperature setting route, a temperature sensor 62 senses the temperature of the pool water and transmits an amplified temperature signal "TEMPIONAMP" to the control unit 50 via the electronic interface board 200. The control unit 50 compares the measured temperature to a predetermined temperature by means of an electrode current chart or an algorithm. A signal in respect of the sensed temperature is transmitted to an electrode current feed controller 107. The current feed controller 107 is set to a specific resistor value with signal "CURSETC-TRL" that enables the current feed controller 107 to operate at the predetermined current value.

This current value "ISET" is then fed through the electrodes 70 and 71, thereby insuring the correct ion dosing. The current selection resistors can vary between any decided value.

The pool ioniser employed in the system according to the invention is adapted to maintain constant current flow by maintaining constant power supply to the electrodes 70 and 71. The control unit 50 determines the correct current to be applied and then maintains the current supply at the required level. If the current supply deviates from the required level, an alarm draws a user's attention to this fact.

An example of a preset algorithm for controlling the ionizing current is set out hereunder.

| Temperature | Current |
|---|---|
| <18° C. | 20 mA |
| 18° C.–21° C. | 40 mA |
| 21° C.–26° C. | 60 mA |
| 26° C.–31° C. | 80 mA |
| >31° C. | 100 mA |

Electrodes 70 and 71 are energized with a half-wave rectified voltage of 13V and the polarities of the electrodes are altered in consecutive cycles in the order of 60 minutes each, permitting release of ions into the pool water. Energizing the electrodes 70 and 71 generally results in electrodes C' and D' (FIG. 18) becoming positively charged and electrodes C and D becoming negatively charged. If this scenario were to continue for a prolonged period of time the negative electrodes C and D would corrode away and would have to be replaced relatively frequently. To prevent this from happening, the process of altering polarity of electrodes is included in the system. The alteration time is pre-set in the control unit 50, varying in the order of 60 minutes. The applicant believes that by altering electrode polarity, electrode life can be substantially increased. The control unit 50 includes means for warning a user if the electrodes need to be replaced. The main display 65 and the remote unit 66 will display the value of the current between the electrodes, the polarity of the electrodes and the temperature compared to the current setting as set by the control unit 50.

A main cover 72 is releasable attached to an upper part of the main housing 31 by means of hinged connection means 77. In addition, releasable mounting clips 33 are provided for facilitating location of the main cover 72 on the main housing 31. A rubber O-ring 82 is located between the main cover 72 and the main housing 31 to facilitate a watertight and dust proof seal between the same. The main cover 72 houses the secondary housing 74, the secondary housing 74 being dimensioned for housing the motorized means 39, the gearbox 38 and the electronic interface arrangement 200.

The main cover 72 also includes a user interface 57 which includes a main display 65 and user keys 78 that is connected to the microprocessor of the control unit 50. The main display 65 is located within a display housing 75, which in turn is attached to an upper end of the main cover 72. The user interface 57 incorporates a rubber-like keypad 76 and a keypad support 79 by means of which a user can alter a number of set points for the systems. The user interface 57 preferably also includes indicating means (not shown), for example audio alarms or warning lights, for alerting a user to a potential problem in the system. A shaded lens 80 is locatable in the main cover 72 covering the main display 65 for protecting the latter. A display cover 81 is hingedly connected to the main cover 72 for protecting the shaded lens 80, keypad 76 and display module of the main display 65 against water, sunrays and dust.

Figure 17:
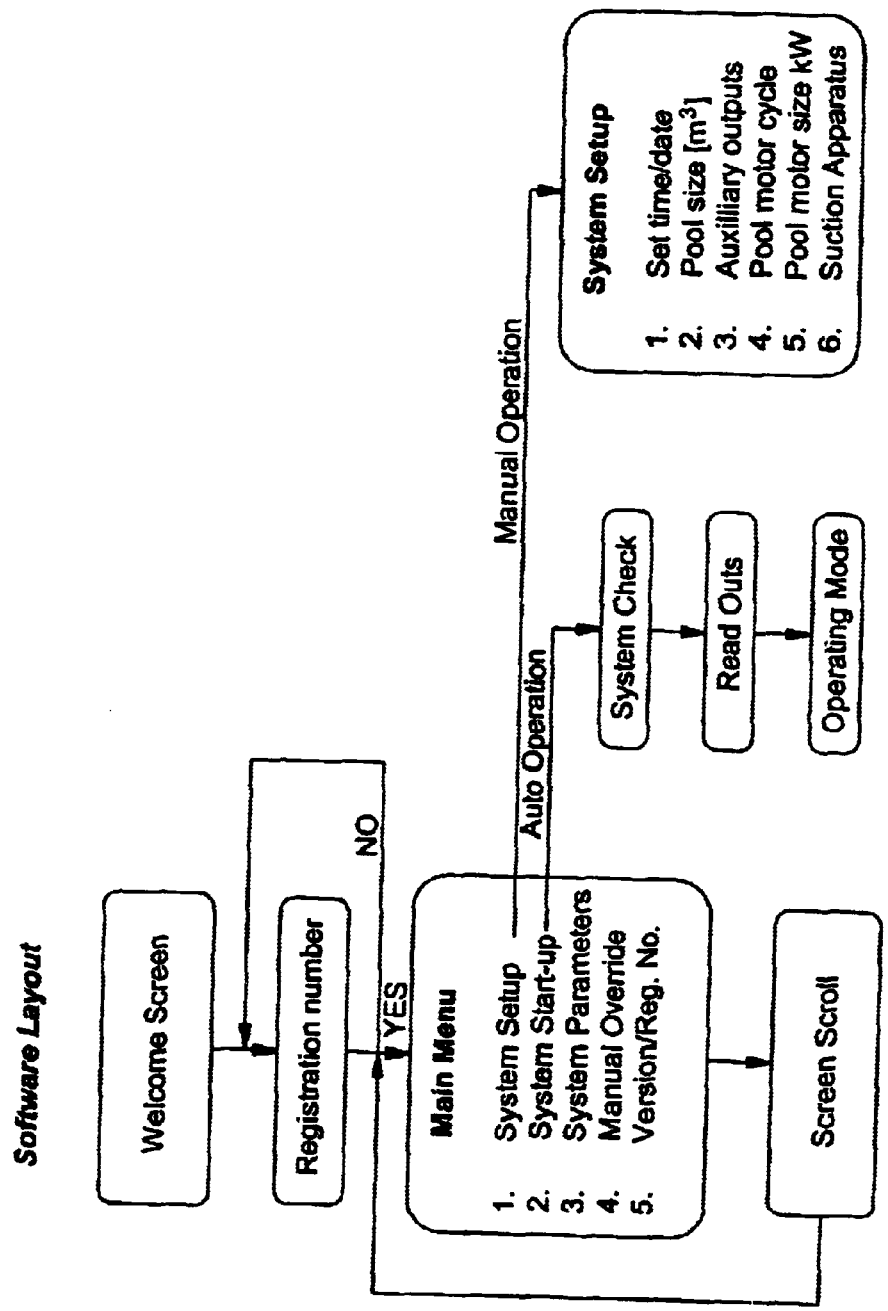
FIG. 17 is a flow chart indicating the software layout of the system.

Reference is now made to FIG. 17. After the system is installed the power is switched on. A first screen on the main display 65 welcomes the user. The welcome screen is displayed for a few seconds after which it requests a user to enter his registration number. If the registration number is incorrectly entered for 3 times consecutively, the, system locks out and the screen prompts for specialised help. If the registration number is entered correctly, the system proceeds with an automatic calibration procedure.

The main menu prompts for specific function operations as shown in FIG. 17:

Time/date: The system prompts for the correct time and date.

Pool Size: The user is required to enter the length, width and average depth of the pool.

Auxiliary Outputs: The time for the relays to operate is set in this function.

Procedural example for switching the pool light on or off:
  Enter Auxiliary Outputs
  Enter the auxiliary output name "Pool light"
  Set the time for the light to switch on and off Pool Motor Cycle: In this function there will be two choices:

Manual: When to switch on and when to switch off

Auto: The time for commencing with the filter operation

Pool Motor Size: Enter the pool pump motor size in kilowatts [kW]. This will be used to correlate the flow rates as well as the maximum pressure and in turn will give information on the pool pump condition.

Suction Apparatus: The user is required to specify whether a suction apparatus is installed, since this has an influence on the flow rate of pool water through the system.

System Start-up

1. Routine-System Check
   a) Check if the battery backup is connected by testing the voltage. If there is a problem prompt the user, otherwise go to next.
   b) Check if system has power from the main source. If there is a problem prompt the user, otherwise go to next.
   c) Check pressure with the valve in the closed position and the pool pump switched on. This will determine the maximum pressure output of the pool pump. The value is stored as $P_{cl}$.
   d) Check the pressure with the valve in the bypass position. This will indicate the lowest possible pressure when the water is circulated. The value is stored as $P_{bp}$.
   e) Check the pressure with the valve in the filter position. This will indicate the pressure in the normal working mode. The value is stored as $P_{fl}$.
   f) Check the water temperature. A temperature beneath 17° C. is indicative of winter conditions. When the pool water temperature decreases to below 5° C., water is pumped from the filtration system to prevent water pipe damage. A temperature in excess of 17° C. is indicative of summer conditions.
   g) Check the water level.
   h) Check the pH level.
   i) Check the water conductivity.

2. Readouts
   a) Indicate power on
   b) "Battery low (see manual)"
   c) "System condition impeller, leaks, sand, leafs, filter time, correlate kW to pressure."
   d) "Set backwash pressure".
   e) "Set ioniser to summer or winter temp=x° C"
   f) "Water level low/high=will correct"
   g) "pH=x to acidic/to alkaline will set to pH=7 add x ml/day x days"
   h) "Conductivity high/low=x ppm"

3. Operating Mode
   Display all the relevant parameters i.e. temp, pH, etc. (scrolling process)
   Wait for preferred on-time.
   Notify 3 monthly ioniser electrodes checks
   Notify user if any other faulty conditions occur (e.g. pH, water level and the like)

4. Continuous Operation
   a) Backwash
   The pool pump must always be off when the valve rotates to the desired position.
   Backwash for a fixed time=x min. The system will only backwash if the backwash pressure achieves the pressure set in system startup (1(e) above).
   Routine: Backwash-Rinse-filter (check $P_{fl}$). If the measured pressure value is high in comparison to the pressure value associated with a clean sand filter, backwash again up to 3 tries then go to lockout Notify.
   b) Fault Conditions
   Power failure—Move valve to closed position
   If the backwash/rinse/waste operation proceeds for longer than 10 min, a warming alarm goes off
   If motor gearbox combination cannot rotate, alarm goes off
   If the pressure drops when the motor is running, notify of an inlet problem
   If the pressure is high when the motor is running, backwash or indicate output problems.

As indicated in FIG. 18, the electronic interface arrangement 200 acts as an interface between various sensor means and their respective measuring points. The electronic interface arrangement 200 can also include one or more amplifiers for amplifying signals being transmitted from the various sensor means. The electronic interface arrangement 200 can be adapted to attach the interfaces required for different mode types manufactured according to the invention.

Figure 19:
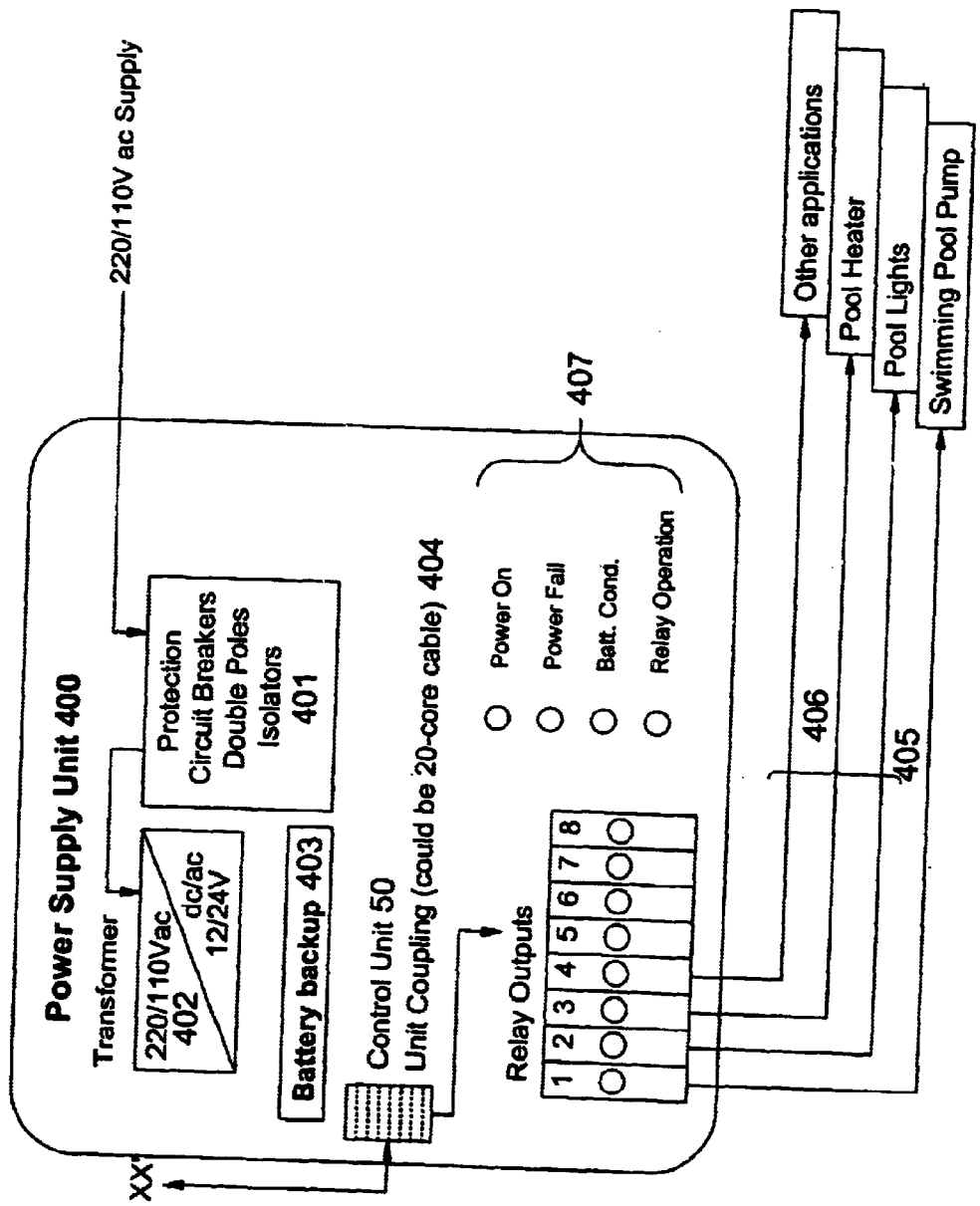
FIG. 19 is a schematic illustration of a power supply unit utilized in the invention.

Referring now to FIG. 19, the system also includes a power supply unit 400 for providing one or more components in the system with the required power. The power supply unit 400 could include protection means 401 (e.g. circuit breakers and isolators); a transformer 402 for converting the rains voltage supply to a suitable voltage, preferably ranging between 12V ac and 24V ac; a 12V dc battery backup 403; a cable connector 404; a pool pump relay 405; an amount of auxiliary relays 406 for swimming pool and garden lights or the like; and indicating lights 407.

The power supply unit 400 is controlled by the control unit 50, which activates the relays 406 either according to pre-set time intervals, or automatically according to ambient light intensity or temperature. Relay 405 controls the operation of the pool pump. The indicating lights 407 indicate what is happening inside the power supply unit 400. The power supply unit 400 supplies a dc voltage to the electronic interface arrangement 200, which in turn supplies a regulated dc voltage to control unit 50 and user interface 57.

Figure 22:
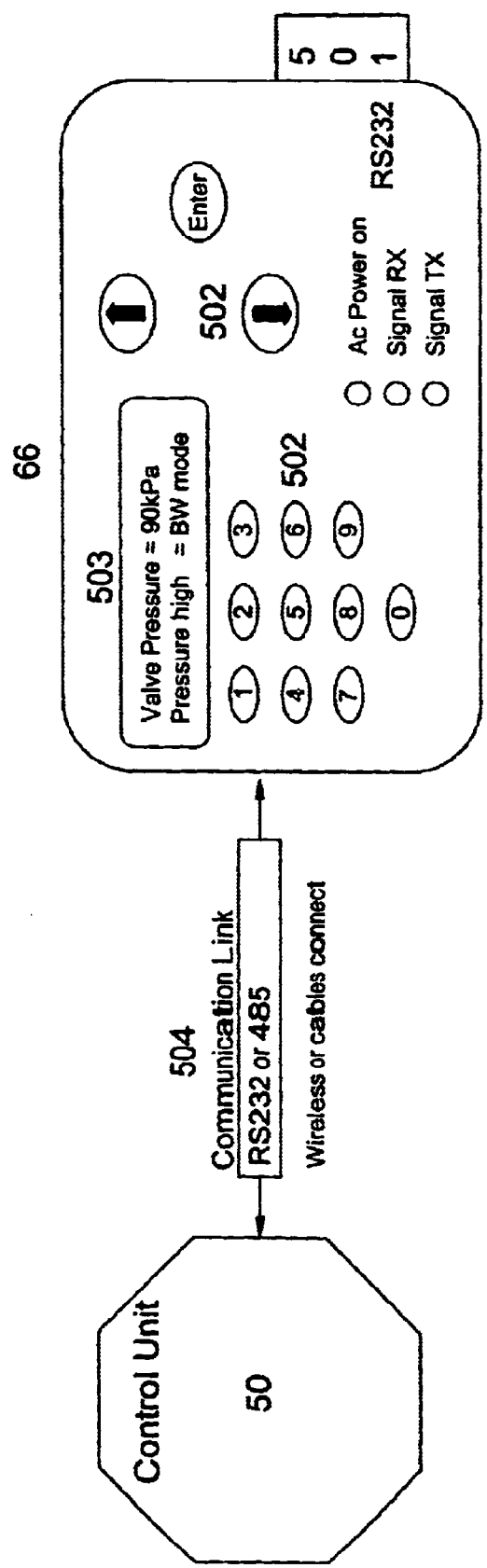
FIG. 22 is a schematic illustration of a remote unit utilized in the invention.

With reference to FIGS. 14 and 22, the remote unit 66 includes a RS232 communications port 501 capable of communicating with a personal computer or a telephone communication instrument (not shown). The remote unit 66 further includes keypads 502 and a LCD display 503. A communication link 504 is provided between the control unit 50 and the remote unit 66, the communications link 504 either being a cable connection or a wireless connection.

It will be appreciated that many embodiments of the invention may be possible without departing from the spirit or scope of the invention as set out in the claims.

What is claimed is:

1. A multivalve unit for a water flow and filtration system of a swimming pool, the multivalve unit comprising
   a valve housing having a number of inlet and outlet ports;
   regulating means suitable for regulating the flow of water through selected conduits of the filtration system, the regulating means comprising
      at least one sensor means located in the regulating means adapted for sensing at least one adjustable variable of the swimming pool water;
      rotatable selector means arranged in association with the valve housing for independently opening and closing the inlet and outlet ports;

biasing means for biasing the rotatable selector means into a sealed position in the valve housing; and motorized means operatively associated with the selector means and adapted to rotate the selector means; wherein the arrangement being such that the selector means is rotated while it is in a seated position in the valve housing.

2. The multivalve unit according to claim 1 wherein the multivalve unit comprises control means for automatically controlling the regulating means in a predetermined manner wherein the control means comprises a microprocessor.

3. The multivalve unit according to claim 2 wherein the multivalve unit comprises a descaler for softening or decalcifying of the pool water, the descaler being located within a main housing of the regulating means and operable in conjunction with a pool pump, the arrangement being such that water flow through the multivalve unit, as indicated by water pressure, indicates a corresponding signal to be transmitted to the microprocessor, which in turn activates a pool ioniser and/or a pool descaler.

4. The multivalve unit according to claim 2 wherein the sensor means is connected to a control means, the control means automatically controlling the regulating means in a predetermined manner; and adjustment means for adjusting such variable in response to a signal relayed from the sensor means to the control means.

5. The multivalve unit according to claim 1 wherein the sensor means is connected to a control means, the control means automatically controlling the regulating means in a predetermined manner; and adjustment means for adjusting such variable in response to a signal relayed from the sensor means to the control means.

6. The multivalve unit according to claim 5 wherein the sensor means comprises first sensor means located in the regulating means and including a rotatable positioning disc operatively associated with at least one positioning sensor and including a slotted peripheral skirt; and a number of slotted photo-optical positioning sensors arranged in accordance with the inlet and outlet ports of the valve housing, the arrangement being such that the slotted peripheral skirt of the positioning disc is rotatable through the slots of the photo-optical positioning sensors so as to indicate the position of a particular inlet or outlet port of the valve housing when a slot in the peripheral skirt of the positioning disc passes through a slot in one of the photo-optical positioning sensors.

7. The multivalve unit according to claim 6 wherein one end of the rotatable shaft protrudes above the first sensor means and comprises a lever arm extending from that end of the shaft, the lever arm enabling a user to override the electronic functioning of the motorized means so as to adjust the rotatable disc seal manually between various positions.

8. The multivalve unit according to claim 5 wherein the sensor means comprises pressure sensor means for sensing sand-filter pressure in the swimming pool, the pressure sensor means comprising a pressure nipple located within a main housing of the regulating means and arranged in communication with a pressure transducer, the pressure transducer being capable of transmitting a signal to a microprocessor of the control means in respect of the sand-filter pressure sensed.

9. The multivalve unit according to claim 8 wherein the pressure sensor means comprises an amplifier for amplifying a signal received from the pressure transducer before transmitting the same to the microprocessor, the microprocessor being programmed with a predetermined algorithm adapted to utilize the signal transmitted from the pressure transducer to control operation of the regulating means, the arrangement being such that a high-pressure value is indicative of a dirty sand-filter and consequently the need for executing a backwash function and a rinse function; a low-pressure value is indicative of a clean sand-filter; and a pressure of below 40 kPa is indicative of a blocked pool pump inlet, which generally results in a decrease in the overall water pressure in the system.

10. The multivalve unit according to claim 5 wherein the sensor means comprises a temperature sensor for sensing pool water temperature, the temperature sensor being locatable within a main housing of the regulating means and being at least partially submerged in the pool water.

11. The multivalve unit according to claim 5 wherein the microprocessor is preprogrammed with preferred values for one or more variables relating to maintenance of the swimming pool water, so that upon receiving a signal from the sensor means, the microprocessor analyzes and compares a received value with the preprogrammed value for the particular variable in question, in response to which the microprocessor activates a component of the multivalve unit.

12. The multivalve unit according to claim 11 wherein the microprocessor comprises a timer wherein the timer serves as reference means for governing operation of the microprocessor;

display means for displaying information in respect of one or more of the variables, the display means including an alarm and indicating lights for indicating what function is being performed at a particular moment, and being embodied in a main cover of the main housing and a keypad embodied in the main cover whereby a user may alter one or more of the preprogrammed values.

13. The multivalve unit according to claim 12 wherein the microprocessor is operable by means of a remote control unit whereby a user may override the automated function of the microprocessor so as manually to control operation of the regulating means of the multivalve unit, the remote control unit including display means and a keypad by means of which a user may manipulate the pool functions from a remote location.

14. The multivalve unit according to claim 1 wherein the selector means is a rotatable disc seal locatable in the valve housing, the rotatable disc seal being rotatable relative to the valve housing by means of a rotatable shaft extending vertically from the disc seal and attached to the motorized means.

15. The multivalve unit according to claim 14 wherein the rotatable disc seal comprises an elongate chamber and an aperture located radially opposite the elongate chamber.

16. The multivalve unit according to claim 14 wherein the regulating means further comprises a locking unit attached to an upper end of the shaft which extends vertically from the disc seal, the locking unit being adapted to facilitate installation of the rotatable disc seal by pretensioning the biasing means.

17. The multivalve unit according to claim 1 wherein the motorized means is connected to a control means, the control means automatically controlling the regulating means in a predetermined manner, and the motorized means is electronically operated to rotate a disc seal located in the valve housing to select various positions to regulate the flow of water through selected conduits of the filtration system.

18. The multivalve unit according to claim 1 wherein the regulating means further comprises a main housing releasably mountable to the valve housing in a substantially pressure-tight and watertight engagement, the main housing including a main cover dimensioned for covering the motor and gearbox assembly and a sensor means located in the regulating means; and a secondary cover releasably mountable within the main cover in a splash-proof and dust-proof engagement and dimensioned to house electronic components of the multivalve unit so as to prevent unauthorized tampering therewith, as well as to protect the same from water and dust.

19. The multivalve unit according to claim 18 wherein the regulating means comprises an electronic interface arrangement located within the secondary cover and adapted to serve as an interface between at least one sensor means and its corresponding measuring points, the electronic interface arrangement comprising a number of vertically spaced electronic boards for locating a positioning sensor; an analogue board for locating one or more amplifiers for amplifying a signal received from the various sensor means; and a supply board for locating a voltage regulating means.

20. The multivalve unit according to claim 1 wherein the sensor means comprises at least one pH-sensor suitable for sensing the pH-level of the swimming pool water and for returning a signal to a microprocessor of the control unit in respect of the pH-level of the swimming pool water so sensed, the pH-sensor being removably located in a probe housing within a main housing releasably mountable to the valve housing of the multivalve unit such that at least a lower part of the pH-sensor is continuously submerged in the pool water.

21. The multivalve unit according to claim 20 wherein the probe housing includes retaining means for retaining the pH-sensor in the probe housing;

sealing means for effecting watertight engagement between the probe housing and the main housing; and an apertured chamber for in use retaining swimming pool water therein, the arrangement being such that the lower part of the pH-sensor is continuously submerged in the pool water retained in the apertured chamber.

22. The multivalve unit according to claim 20 wherein the signal received from the pH-sensor is amplified before being transmitted to the microprocessor, which then compares the sensed pH-value with a preprogrammed value so as to determine the condition of the pool water, the arrangement being such that if the pH-level drops below the preprogrammed value, the micro-processor activates a valve or chemical pump to permit one or more required chemicals to enter the swimming pool from external chemical containers so as to adjust the pH-level of the pool water to the programmed value.

23. The multivalve unit according to claim 1 wherein the multivalve unit comprises a pool ioniser located in a main housing of the regulating means and comprising probes consisting of copper, zinc and silver respectively used for restraining growth of algae, bacteria, and viruses in the swimming pool water.

24. The multivalve unit according to claim 23 wherein the pool ioniser is adapted to maintain constant flow by maintaining constant power supply to its electrodes and is further adapted to alter the polarity of the electrodes.

25. The multivalve unit according to claim 1 wherein a sensor means located in the regulating means comprises water level sensor means located within a main housing of the regulating means for sensing water level in the swimming pool and for transmitting a signal in respect of the water level to the microprocessor; the arrangement being such that when the water level drops below a preprogrammed value, the microprocessor activates a water level regulating valve so as to permit water supply to the swimming pool, the water level regulating valve being arranged in communication with a primary water supply line and being located on a return conduit intermediate the pool filter and the swimming pool.

26. The multivalve unit according to claim 1 wherein the multivalve unit is operatively associated with a power supply unit connected to the regulating means, the power supply unit including a transformer, isolation means, circuit breakers, auxiliary relays, and battery backup means.

27. The multivalve unit according to claim 26 wherein the power supply unit is enclosed in a substantially watertight enclosure.

28. The multivalve unit according to claim 1 wherein the motorized means includes a motor capable of driving a speed reduction gearbox at a drive speed of between 0.8 and 2.0 rpm, with a torque of between 10 Nm and 20 Nm.

29. The multivalve unit according to claim 1 wherein the motorized means includes a motor capable of driving a speed reduction gearbox with a torque of 16 Nm.

* * * * *